INVENTOR.
AUGUST L. KRAFT
BY
McLean, Morton and Boustan
ATTORNEYS

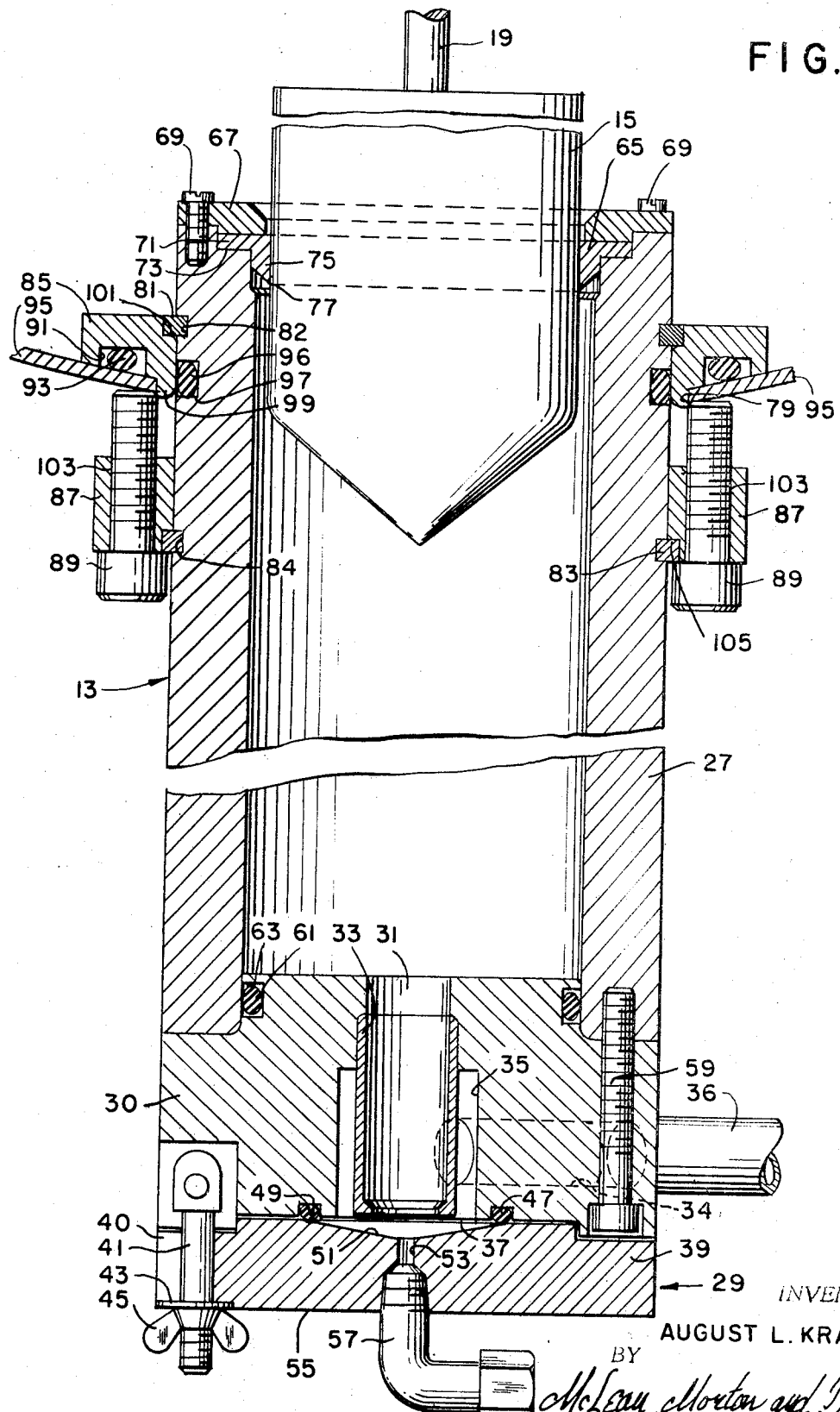

July 28, 1970  A. L. KRAFT  3,521,789
HANDLING FLUID MATERIALS
Filed Feb. 20, 1968  7 Sheets-Sheet 3

INVENTOR.
AUGUST L. KRAFT
BY
McLean, Morton and Boustead
ATTORNEYS

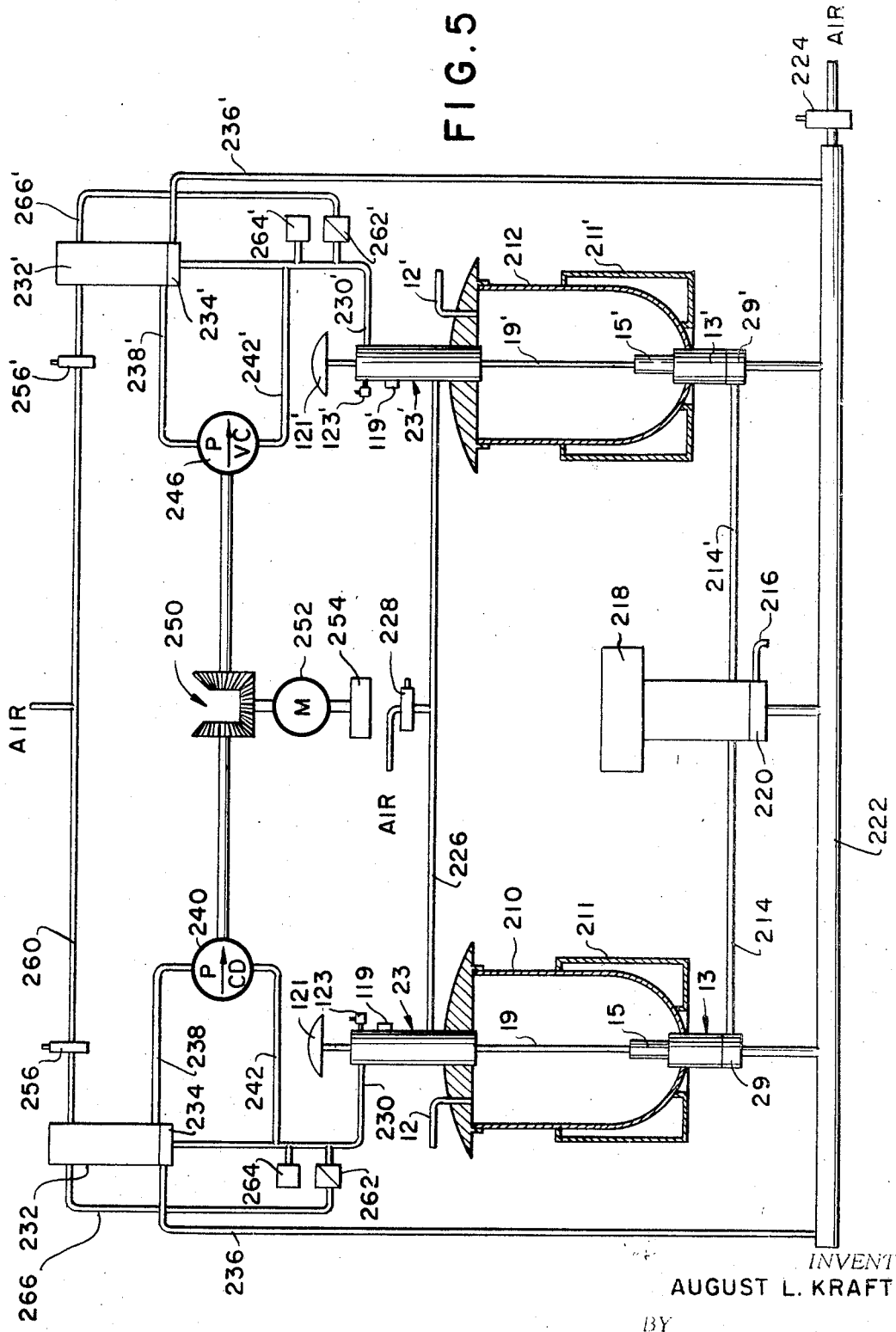

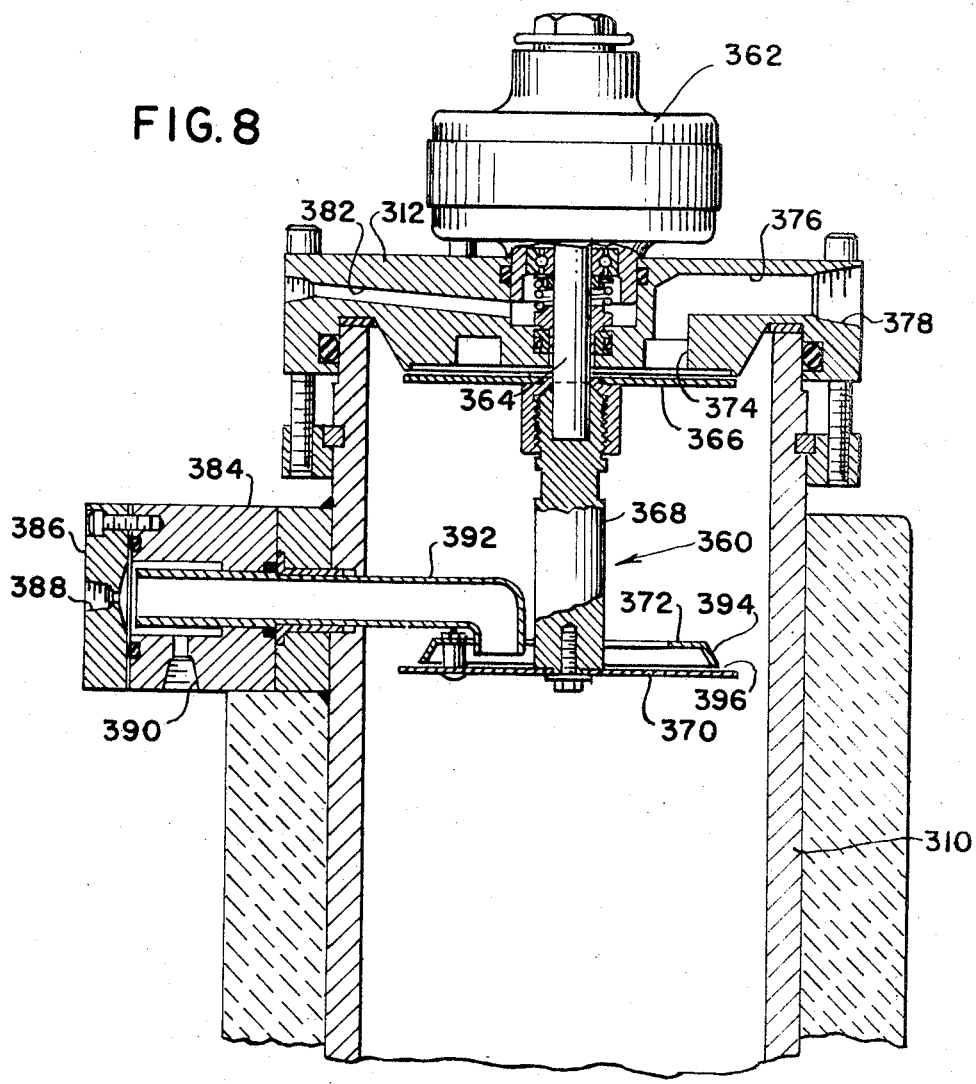

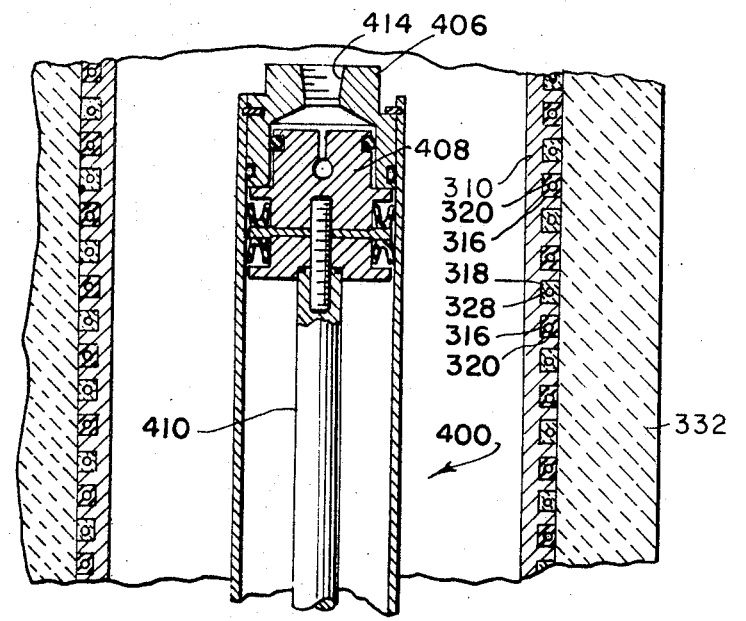
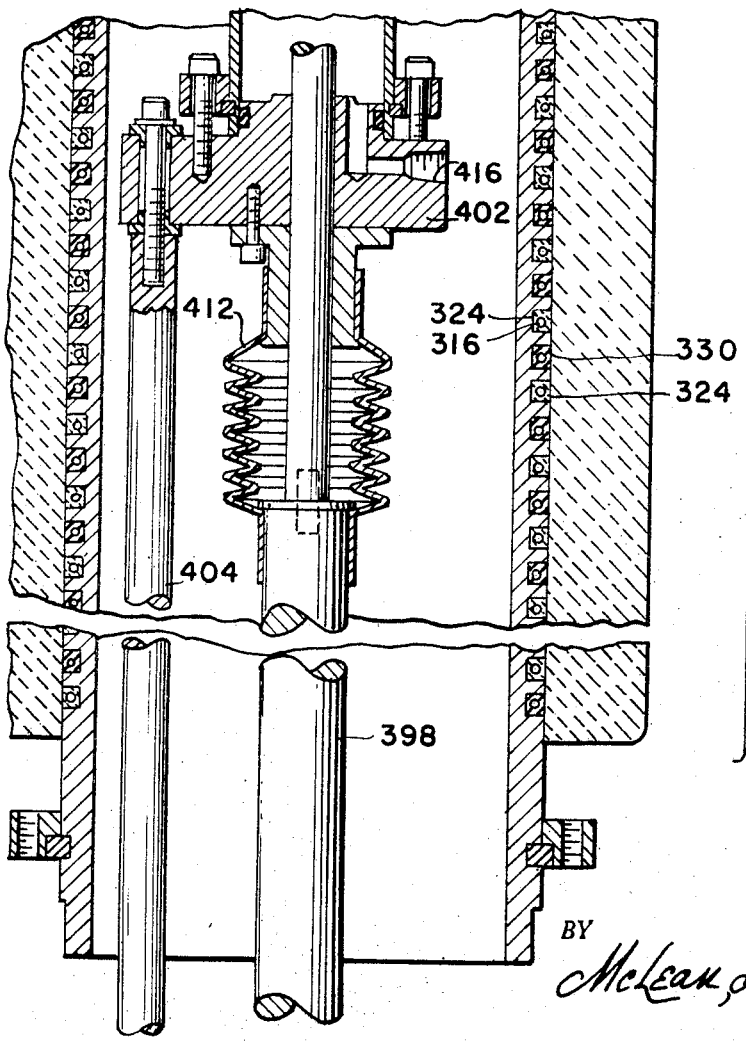
FIG. 9
INVENTOR.
AUGUST L. KRAFT 3,521,789
HANDLING FLUID MATERIALS
August L. Kraft, Roselle Park, N.J., assignor to Automatic Process Control, Inc., Union, N.J., a corporation of New Jersey
Filed Feb. 20, 1968, Ser. No. 706,959
Int. Cl. B67d 5/08
U.S. Cl. 222—1          10 Claims

ABSTRACT OF THE DISCLOSURE

A method and apparatus for effecting withdrawal of a liquid from a vessel is disclosed whereby liquid from the vessel is introduced into an associated chamber which chamber has a liquid discharge outlet and discharge valve. The chamber has one closed end and a piston seal at the other, open end. A piston is advanced into the chamber in sealing relationship with the piston seal until a sufficient volume of the chamber is displaced by the piston so that a pressure is created within the entrapped fluid sufficient to eliminate voids and the piston stalls. Thereafter, the discharge valve is opened and the piston is moved further into the cylinder forcing a measured amount of the pressured liquid through the discharge outlet.

Included within the scope of the invention is a system (FIG. 5) including a plurality of vessels and associated discharge chambers which operate together. The vessel, with which the metering apparatus is combined, can be a liquid degassing vessel (FIG. 7) and the degassing vessel can be heated by a helically wound heating element controlled by a helically wound temperature sensing element.

Alternately, the metering system can be combined with a melting vessel (FIG. 4) having a temperature controlled grid.

FIELD OF THE INVENTION

This invention relates to handling fluid materials and in particular provides an overall system for delivering metered quantities of fluid materials at a desired point of use in proper physical condition for use.

This invention has particular application to systems for withdrawing of reactive materials from a point of storage, rendering such materials in the proper condition for use, e.g., degassing, adjusting temperature, melting, and the like, and then delivering such materials in accurately metered quantities to the point of use, e.g., a mixing chamber, a vacuum casting line and the like. This invention includes the combination of two or more of such systems for mixing metered quantities of two or more mutually reactive materials as, for example, in the casting of epoxy resins, urethanes, and the like.

SUMMARY OF THE INVENTION

In a particular aspect this invention provides a unique metering device for particular application to the metering of exact volumetric quantities of liquids, while in another aspect it provides a combination device capable both of melting a solid to render it fluent and of metering accurate volumetric quantities of such melted solid. In yet another aspect of this invention there is provided a device for both degassing a liquid, while controlling its temperature to a desired set point and of metering exact volumetric quantities of the liquid at such desired set temperature. In a further aspect of this invention there is provided a new heating device for fluids which by unique coupling permits a fluid flowing through such device to be brought exactly to a predetermined temperature under conditions minimizing hold-up of the fluid in the heating device and permitting degassing of the fluid, if desired.

In one aspect the present invention provides a metering apparatus which includes a chamber, e.g., a cylinder, having a closed end which includes a discharge valve. A liquid inlet is provided which preferably utilizes gravity flow to the other end of the chamber, and a piston is mounted with its free end adapted to move into the chamber in sealing relationship with its sides. A means is included for moving the piston into the chamber, and this movement can be considered in two phases.

In the first phase of piston movement the discharge valve is kept closed so that the movement of the piston into the chamber gradually displacing its internal volume pressures the liquid present in the chamber until a pressure of sufficient magnitude is created to take up the yield of this system.

In the second phase of piston movement the discharge valve is opened and further movement of the piston into the cylinder displaces the pressured liquid and forces it out of the chamber through the open discharge valve. An indicator measures the movement of the piston during the second phase of movement which is directly related to the amount of liquid discharged.

Provision is made for causing reverse movement of the piston at the end of each stroke.

In another aspect of the present invention the above described metering apparatus is combined with a liquid degassing vessel whereby liquid is caused to flow down the sides of a vacuum vessel in a thin moving film whereby the liquid is degassed, heated and received in the lower portion of the vessel from which it is removed by the meter described above. In this aspect, the sides of the vessel along which the thin moving film of liquid flows are heated by a closely coupled heating element which is distributed about and along the length of the vessel and which preferably is an electric resistance type heater helically wound about the vessel. With the heating element, or each heating element if more than one is employed, is similarly distributed a temperature sensing element, desirably in the form of a length of wire having a substantial thermal coefficient of electrical resistance. Preferably the temperature sensing device is helically wound about and closely coupled to the degassing vessel between the turns of the heating element. The temperature sensing element is connected in a measuring circuit which detects the sensed temperature and controls the application of power to the heating element to maintain a desired temperature at the walls of the vessel.

The heating arrangement for the liquid degassing vessel is itself an important aspect of this invention, in that it provides a unique manner of heating a liquid. In such a heating device the temperature sensing element senses the average temperature of the vessel in the length thereof about which the temperature sensing element is distributed. Consequently, the introduction of cold liquid at the upper end of the vessel causes an immediate decrease in the average temperature requiring the control system to call for more heat. As a result, since the heater is uniformly distributed along the same length of the vessel as is the temperature sensing element, the temperature at the lower end of the vessel is hotter than the upper end. In a dynamic situation with cold liquid constantly entering the upper end of the vessel, the system will tend to activate the heating element to maintain an average temperature along the length of the vessel such that approximately a uniform temperature differential will exist between the inner wall of the vessel and the fluid, assuming uniform distribution of the heating element and of the temperature sensing element and uniform dimensions of the vessel along the length in question, and assuming uniform flow of the liquid along the inner wall of the vessel. Assuming perfect conduction from the inner wall to the moving liquid the temperature gradient between the inner wall and the liquid will be uniform with the result that the liquid leaving the lower end of the heated section of the vessel will be at the average temperature of the inner wall of the vessel. In practice, these results have been substantially achieved, and the device is effective to heat a liquid without overheating, with minimum volume hold-up and in a rapid manner.

In a further aspect of the present invention the meter system described above is combined with a melting vessel whereby solids are placed on a heating element within a vessel, which heating element is impervious to solids but not to liquids. The solids are melted under controlled conditions to maintain a desired liquid accumulation in the lower portion of the vessel from which the liquid is withdrawn by the above described meter.

In another aspect the present invention provides an apparatus for concurrently metering liquid from two vessels in a constant ratio to each other. In this embodiment two meters are incorporated into two vessels and the meters are operated in such a manner that liquid is concurrently introduced to each of the two metering chambers and the pistons of each cylinder are advanced into the cylinders to create pressures in each cylinder sufficient to substantially eliminate the yield of each system, and discharge from each cylinder is commenced and stopped simultaneously at measured relative quantities.

The liquids to which the present invention is particularly suited include nylons, epoxies, polyesters, urethanes, silicones, anhydrides and other fluids, many of which are abrasive or contain abrasive fillers and require special handling and some of which are unstable, have heat histories and must be handled in small amounts.

BRIEF DESCRIPTION OF THE DRAWINGS

For a further description of the present invention reference is made to the appended drawings of which:

FIG. 2 is an enlarged view in vertical section of the metering cylinder shown in FIG. 1;

FIG. 5 is a somewhat schematic elevation shown partly in section of two meters similar to that shown in FIG. 1 incorporated in a system for delivering two liquids at constant ratios to each other;

FIG. 8 is an enlarged fragmentary vertical section of the upper portion of the degassing and metering device shown in FIG. 7;

FIG. 9 is an enlarged fragmentary section of the central portion of the degassing, heating and metering device shown in FIG. 7.

DESCRIPTION OF THE PREFERRED EMBODIMENTS

Figure 1:
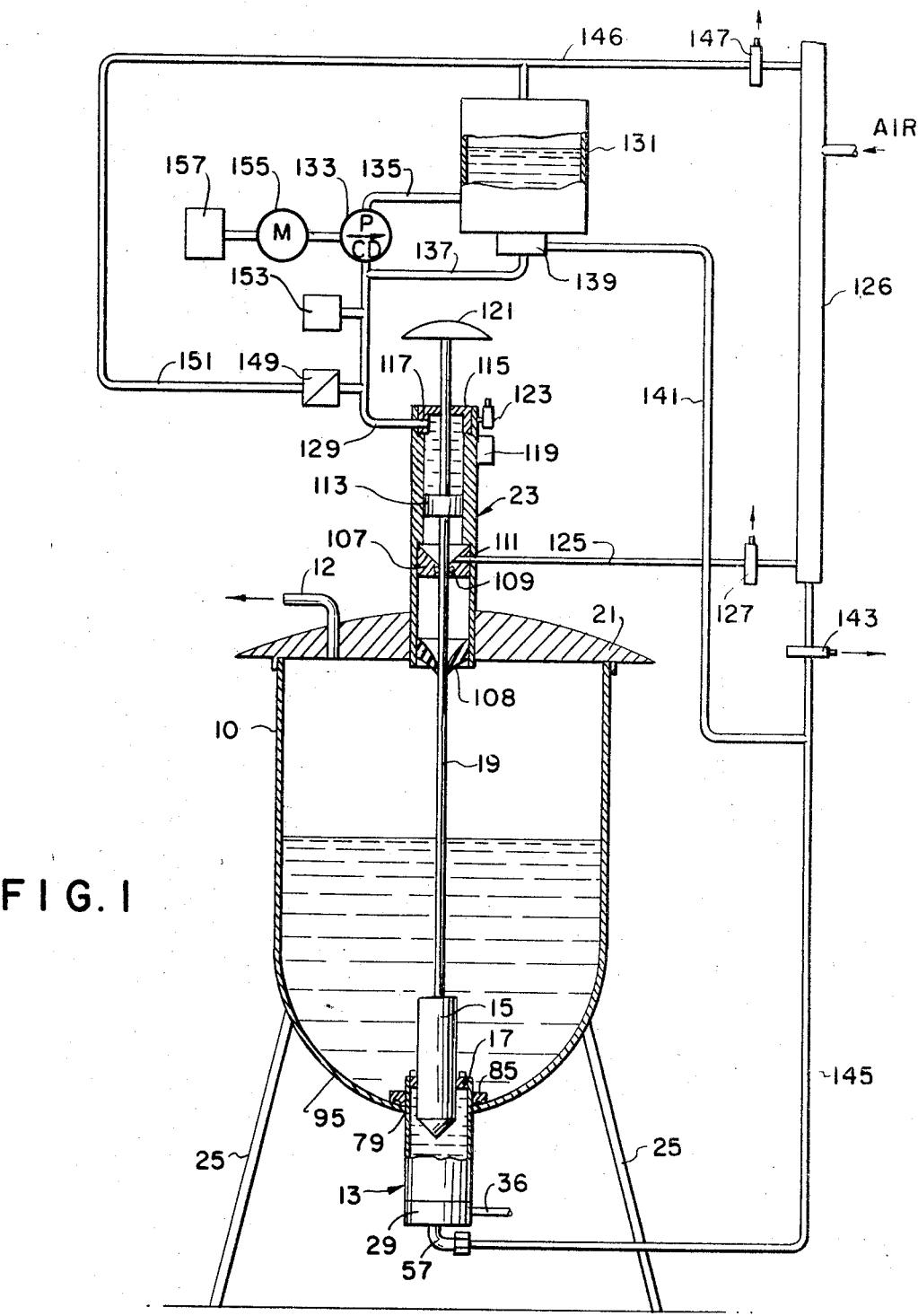
FIG. 1 is a somewhat schematic elevation shown partly in section of a metering apparatus according to the present invention.

Referring to FIG. 1 an enclosed vessel 10 is shown having a fitting 12 attached to its top 21 by which the interior of vessel 10 can be subjected to vacuum, or an inert gas or other gaseous atmosphere at any desired pressure. A metering cylinder 13 is connected to the bottom 95 of vessel 10 and a metering piston 15 extends into metering cylinder 13 from its upper end 17. Metering piston 15 is supported by piston rod 19 which extends into an operating cylinder 23 connected to the top 21 of vessel 10. Vessel 10 is supported by legs 25 which provide sufficient clearance beneath the vessel for access to metering cylinder 13.

Metering cylinder 13 is shown enlarged in FIG. 2, and includes a vertically elongated body or cylinder housing 27. The lower end of cylinder housing 27 is closed by a check valve 29 which includes a block 30 having a central vertical passage 31 in its top. A tube 33 depending from the upper end of passage 31 in which tube 33 is affixed registers with the upper end of passage 31 which is enlarged in the lower end of block 30 to form an annular discharge passage 35 which surrounds the lower end of tube 33 and communicates with a horizontal liquid discharge conduit 36 through a port 34 in the side of block 30. A diaphragm 37 extends across the bottom of block 30 closely adjacent the lower end of tube 33 and is held in place by an air cap 39 affixed to block 30 by a plurality of bolts 41 (one shown) which pass through radial slots 40 in air cap 39 and are pivotally secured to block 30. Each bolt 41 includes a washer 43 and wing nut 45. Diaphragm 37 is held in sealing relationship on the bottom of block 30 by an O-ring 47 located in an annular recess 49 in the bottom of block 30. Diaphragm 37 is made of a high temperature resistant, impervious, resilient material, such as polytetrafluoroethylene, tetrafluoroethylene-hexafluoropropylene copolymer, and fabrics impregnated with such materials. Air cap 39 is relieved in its face adjacent diaphragm 37 to form a shallow, conical recess 51, which extends below diaphragm 37 and has a slightly greater base diameter than annular discharge passage 35 with which it is aligned. A partially threaded central passage 53 in cap 39 communicates conical recess 51 with the under surface 55 of air cap 39, and a suitable fitting 57 is threadedly connected to the lower end of passage 53 to make connection with an air supply for the purpose of admitting air to conical recess 51 under sufficient pressure to force diaphragm 37 against the lower edge of tube 33 and to thus prevent the discharge of fluid from metering cylinder 13. Check valve 29 is held tightly to cylinder housing 27 by a plurality of bolts 59 (one shown) passing through block 30, and the connection is made fluid-tight by an O-ring 61 held in an annular groove 63 in the upper portion of block 30 which is necked down to fit snugly within cylinder housing 27.

At the upper end of cylinder housing 27 a piston seal 65 of a suitable resilient material, such as polytetrafluoroethylene or urethane rubber, is held in place by a circular retaining ring 67 and a plurality of socket screws 69 which are secured in the top of housing 27. Piston seal 65 is ring-shaped having a flanged outer portion 71 which mates with a shoulder 73 at the top of cylinder housing 27 and an annular central portion 75 the lower edge of which is tapered downward from the wall of cylinder housing 27 to a point 77 at its inner edge. The inner diameter of seal 65 decreases slightly from top to bottom and provides a loose fit with metering piston 15 as it passes into metering cylinder 13. The lower portion of metering piston 15 is tapered to a dull point to prevent damage to seal 65 as piston 15 is lowered into metering cylinder 13 from a point above retaining ring 67.

Metering cylinder 13 is attached to an aperture 79 in the bottom 95 of vessel 10 by the interaction of two circular retaining rings 81 and 83, an annular flange-like mounting bracket 85, a locking ring 87 and plurality of bolts 89. Mounting bracket 85 is located inside vessel 10 and includes an annular recess 91 in its underside in which an O-ring 93 is held to provide a seal between mounting bracket 85 and the bottom 95 of vessel 10. The inner diameter of mounting bracket 85 closely surrounds the outer diameter of cylinder housing 27, and an O-ring 95 held in annular recess 97 in the upper portion of cylinder housing 27 seals the relationship of mounting bracket 85 to cylinder housing 27. Mounting bracket 85 includes a cylindrical flange 99 which is received in aperture 79 in the bottom 95 of vessel 10 and an upper shoulder 101 which bears against retaining ring 81 when the latter is seated in an annular groove 82 near the top of cylinder housing 27. Locking ring 87 includes threaded apertures 103, through which bolts 89 are threadedly passed to bear against the bottom 95 of vessel 10 about aperture 79 forcing locking ring 87 downwardly. A shoulder 105 which seats against a retaining ring 83 received in an annular groove 84 in the side of cylinder housing 27 limits downward movement of locking ring 87 to permit bolts 89 to press firmly against bottom 95 and thus secure the seal between bottom 95 and bracket 85.

Referring again to FIG. 1, operating cylinder 23 includes a piston rod wiper ring 108 at the lower portion thereof which closely surrounds piston rod 19, the lower end of which is connected to the upper end of piston 15. Wiper ring 108 prevents liquid and other fluent materials in vessel 10 from passing upwardly into operating cylinder 23 along piston rod 19. A lower piston stop 107 is fixedly positioned within operating cylinder 23 a distance above wiper ring 108 equal to the stroke of piston rod 19 and includes a suitable packing ring 109 which provides a gas-tight seal between piston rod 19 and piston stop 107. An air inlet port 111 passes through piston stop 107 to permit the entry of air into operating cylinder 23 immediately above stop 107.

An operating piston 113 is securely affixed to piston rod 19 below the upper end of rod 19 within operating cylinder 23 above stop 107 and moves up and down within cylinder 23 in sealing relationship with its interior walls between piston stop 107 and an upper end plate 115 fixedly positioned at the top of operating cylinder 23. Piston 113 has the same cross-sectional area as piston 15. Cylinder end plate 115 includes an oil port 117 which provides for the introduction of oil into and withdrawal of oil from operating cylinder 23, above operating piston 113, and end plate 115 is centrally apertured to receive the upper end of piston rod 19 which extends through plate 115 in sliding and sealing contact with plate 115. An upper limit switch 119 is affixed to the exterior of operating cylinder 23 at the upper extremity of movement of operating piston 113 and is responsive to the presence of operating piston 113 at that point. A lower limit switch 123 is attached to the top edge of operating cylinder 23 and is operated by an actuator cap 121 affixed to the top of piston rod 19 which, as noted above, extends out through plate 115. Cap 121 contacts lower limit switch 123 as piston rod 19 reaches its lowest extremity of movement, i.e., when metering piston 15 touches the bottom of meter cylinder 13. Operating cylinder 23 is designed to provide for sufficient movement of piston rod 19 responsive to forces applied to operating piston 113 to carry metering piston 15 to the bottom of metering cylinder 13 and in the reverse direction to completely withdraw metering piston 15 from metering cylinder 13.

An air line 125 is connected to air inlet port 111 and to a high pressure air manifold 126 through a solenoid operated 3-way valve 127 which in its normal de-energized condition connects air line 125 to manifold 126 and in its energized condition vents air line 125 to the atmosphere. An oil conduit 129 is connected to oil port 117 and is in turn connected to an oil reservoir 131 through a constant delivery oil pump 133 and conduit 135. A bypass conduit 137 is connected to oil conduit 129 at the discharge side of pump 133 and provides for the bypassing of oil through an air operated bypass valve 139 to the bottom of reservoir 131. Bypass valve 139 is operated by an air line 141 which is connected to manifold 126 through solenoid operated 3-way valve 143 which in its normal de-energized condition connects air line 141 to manifold 126 whereby bypass valve 139 is held in the open position in which the flow of oil from bypass conduit 137 into reservoir 131 is unimpeded. Valve 143 also controls the flow of air through air conduit 145 to check valve 29 in metering cylinder 13. The normal position of valve 143 admits air under pressure to check valve 29 forcing diaphragm 37 against tube 33 and preventing the flow of liquid out of metering cylinder 13.

The top of reservoir 131 is connected through air conduit 146 to manifold 126 through a solenoid operated 3-way valve 147 which in its normal de-energized position vents the top of reservoir 131 to atmosphere and in its energized condition pressurizes reservoir 131. A liquid-air pressure switch 149 is connected in oil conduit 129 and by air conduit 151 to air conduit 146. Pressure operated electric switch 149 closes a pair of electric contacts only when the liquid pressure in oil inlet conduit 129 is equal to the air pressure in air conduit 151. A second pressure operated electric switch 153 is provided in oil conduit 129 between switch 149 and pump 133 to operate as a safety feature should abnormal pressures occur in oil conduit 129 because of malfunction by opening a pair of normally closed contacts. Constant delivery pump 133 is driven by an electric motor 155 to which an automatic counter 157 is attached having a pair of normally open electric contacts which close when a preselected count is reached by counter 157.

Figure 3:
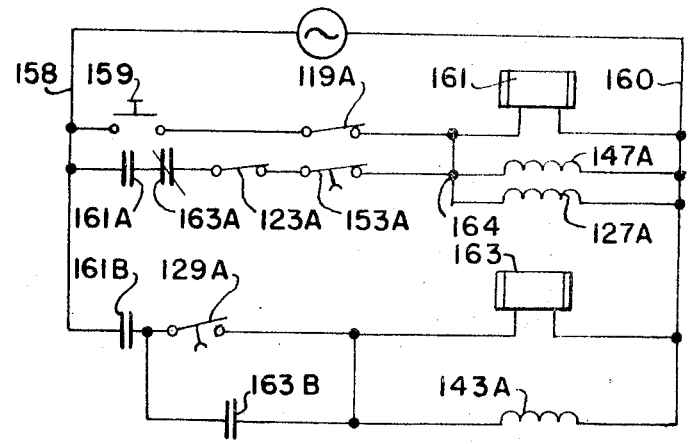
FIG. 3 is a schematic of an electrical control circuit for operating the meter shown in FIG. 1.

The electrical control necessary to the operation of the metering apparatus of FIG. 1 is shown schematically in FIG. 3. A push button switch 159 is provided in series circuit relationship with a pair of normally open contacts 119A of upper limit switch 119 and a control relay coil 161 between power lines 158 and 160, respectively. Two solenoids 147A and 127A are connected in parallel with relay coil 161. A series circuit which includes a pair of normally open relay contacts 161A which close upon energization of relay coil 161, a pair of normally closed relay contacts 163A, a pair of normally closed contacts 123A of lower limit switch 123 and a pair of normally closed contacts 153A of safety pressure switch 153 is connected between power line 158 and the common junction 164 of switch 119A, relay coil 161 and solenoids 147A and 127A. Another circuit connected between power lines 158 and 160 includes a relay coil 163 associated with counter 157, a pair of normally open contacts 129A of pressure switch 129 and a normally open pair of relay contacts 161B which close upon energization of relay coil 161. A solenoid 143A and a normally open pair of relay contacts 163B which close upon actuation of counter relay coil 163 are connected in parallel across counter relay coil 163 and across pressure switch contacts 129A, respectively. Motor 155 is controlled by a separate starter (not shown) and is kept running at constant speed while the metering system is in use.

The operation of the control circuit shown in FIG. 3 begins with the switches in the position shown in the drawing and all solenoids de-energized; motor 155 is running. In this condition, air under pressure is supplied through 3-way valve 127 to cylinder 23 below operating piston 113 forcing piston 113 and its associated piston rod 19 to an extreme upward position; oil reservoir 131 which is partially filled with suitable hydraulic fluid is vented to atmosphere through 3-way valve 147, and check valve 29 and bypass valve 139 are subjected to air under pressure through 3-way valve 143 which causes closure of check valve 29 and the opening of bypass valve 139 to allow full bypass of all oil discharged from pump 133. With operating piston 113 at its extreme upward position, upper limit switch contacts 119A are closed by the presence of piston 113 at its upper limit, and lower limit switch contacts 123A are also closed, i.e., in normal position.

When push button switch 159 is depressed, relay coil 161 is activated closing contacts 161A thereby providing a holding circuit for relay coil 161 even though push button 159 returns to its open position when released and even though operating piston 113 may subsequently move downwardly, opening upper limit switch contacts 119A. The holding circuit for coil 161 remains closed until either pressure switch contacts 153A, lower limit switch contacts 123A or normally closed counter contacts 163A are opened. Closure of push button switch 159 and the consequent closure of contacts 161A energizes solenoids 147A and 127A which operate valves 147 and 127, respectively, to apply air pressure to the top of reservoir 131 and vent the lower portion of operating cylinder 123.

The admission of air under pressure to the top of reservoir 131 increases the back-pressure at bypass valve 139 and forces oil into operating cylinder 23 above operating piston 113 causing the latter to move downwardly in view of the release of air pressure in cylinder 23 below piston 113. This in turn causes metering piston 15 to enter metering cylinder 13 in sealing relationship with piston seal 65. When vessel 10 contains a liquid to be dispensed, the pressure created by metering piston 115 displacing the liquid in metering cylinder 13 causes an upward force against metering piston 15 to build up equaling the force exerted on operating piston 113 by the oil above it causing piston 113 to come to an effective stall when the yield in the liquid in cylinder 13 is used up. This stall is important as it takes the cushion out of the trapped liquid ensuring exact volumetric measurement when the liquid is subsequently dispensed. When movement of metering piston 15 into metering cylinder 13 is stopped and it stalls, the oil throughout the system which includes the oil in the upper portion of operating cylinder 23, in oil conduit 129, in oil bypass conduit 137, in conduit 135 and in reservoir 131 reaches an equilibrium pressure equal to the pressure of the air in air conduit 146 because of the equal cross-sectional area of pistons 15 and 113. Oil continues to recirculate through pump 133, conduit 135, bypass conduit 137 and bypass valve 139.

As the pressure of the oil in oil conduit 129 thus equals the pressure of the air in air conduits 146 and 151, pressure switch contacts 129A close and, in turn, energize counter relay coil 163 and solenoid 143A through contacts 161B which have been retained in closed position by energized coil 161. Upon energization of solenoid 143A, 3-way valve 143 vents air conduits 141 and 145 to atmosphere, closing bypass valve 139 to the further passage of oil and opening check valve 29 thereby allowing the flow of fluid from metering cylinder 13 through annular discharge passage 35, port 34 and discharge conduit 36. The closure of bypass valve 139 forces oil discharged by pump 133 into the top of operating cylinder 23 which, in turn, forces operating piston 113 downward causing concurrent movement of metering piston 15 downward displacing liquid in metering cylinder 13 which discharges through conduit 36.

The actuation of counter relay coil 163 causes counter 157 to register all revolutions of motor 155 occurring thereafter which gives a measure of the oil introduced to operating cylinder 23 and hence indicates the amount of liquid displaced from metering cylinder 13. Activation of counter relay 163 also closes normally open contacts 163B thereby providing a holding circuit for counter relay coil 163 and solenoid 143A, although pressure switch contacts 129A are opened by the increased pressure in oil line 129. Normally closed contacts 163A, however, are not immediately opened by the activation of counter relay coil 163 but are mechanically operated by counter 157 when counter 157 reaches a predetermined count representing the exact amount of liquid discharge desired.

Oil continues to be pumped into the top of operating cylinder 23 until the occurrence of one of three events; the opening of lower limit switch contacts 123A when metering piston 15 reaches the bottom of metering cylinder 13, the opening of safety switch contacts 153A caused by a malfunction creating excess oil pressure, or the opening of normally closed contacts 163A when counter 157 reaches the predetermined figure. The occurrence of anyone of these three events deactivates relay coil 161 which opens contact pairs 161A and 161B de-energizing the entire system. When solenoids 127A and 143A are de-energized air under pressure is admitted through air conduits 125, 141 and 145 forcing operating piston 113 upwardly, opening bypass valve 139 and closing check valve 29. When operating piston 113 reaches its extreme upward position, upper limit switch contacts 119A close and the system is ready for another cycle. It will be noted that if push button 159 is kept depressed, the next cycle of operation will begin immediately upon closure of upper limit switch contacts 119A.

Figure 4:
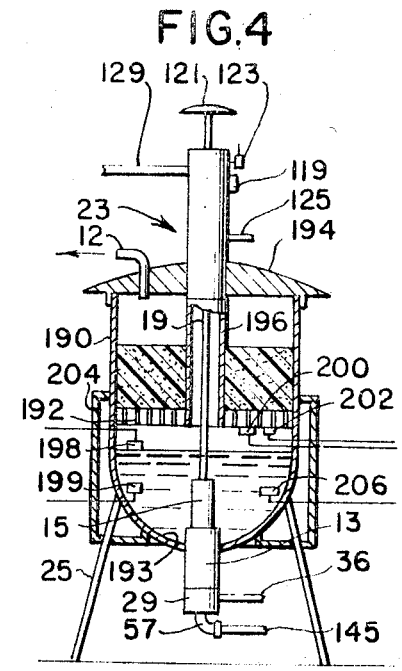
FIG. 4 is a somewhat schematic vertical section of the meter shown in FIG. 1 in combination with a solids melting vessel.

In FIG. 4 the metering system of FIG. 1 is shown in combination with a vessel suitable for melting solids under vacuum or an inert or other gaseous atmosphere. Those portions of FIG. 4 which appear also in FIG. 1 are identified by the same reference numerals in both drawings. A vessel 190 is provided supported on legs 25 and having in the bottom 193 thereof a metering cylinder 13 and in the top 194 an operating cylinder 23 with a piston rod 19 and metering piston 15 extending therebetween. Metering cylinder 13, operating cylinder 23, metering piston 15 and piston rod 19 are similar in all respects to those shown in FIG. 1. The electric and hydraulic control circuits associated with the metering system of FIG. 4 are also identical to the corresponding portions of FIGS. 1 and 3, and only the conduit connections 129, 125 and 145 to operating cylinder 23 and metering cylinder 13 and limit switches 119 and 123 are shown.

An electric heating element 192 is provided in the lower portion of vessel 190 which is of the spiral grate construction similar to that disclosed in U.S. Pat. 3,032,635 and is sized to support powdered solids but pass liquids through it. A fitting 12 is provided in the top 194 of vessel 190 whereby the interior of vessel 190 can be subjected to vacuum or a gaseous atmosphere. A cylindrical column 196 depends from metering cylinder 23 about piston rod 19 through the center of heating element 192 defining between it and the walls of vessel 190 a large annular volume into which solids to be melted can be introduced. As solids above heating element 192 are melted the liquid passes through heating element 192 and is collected in the lower portion of vessel 190.

Heating element 192 is controlled by a maximum liquid level controller 198, a minimum liquid level controller 199 and 2 thermocouples 200 and 202. Liquid level controller 198 maintains a desired liquid reserve in the bottom of vessel 190 by controlling the supply of power to heating element 192. Thermocouple 200 acts to maintain the temperature of heating element 192 slightly below the melting point of the solid being handled. When controller 199 detects a low liquid level, it calls for more heat by increasing power to element 192 to raise its temperature to melt additional solid. Thermocouple 202 is set to shut off heating element 192 at temperatures above the melting point and functions as a safety to detect absence of solid above grid 192 by an increase in temperature of grid 192. Controller 198 detects a high liquid level in vessel 190 and restores control of the temperature of grid 192 to thermocouple 200. By thus controlling the operation of heating element 192 a small amount of liquid is kept always ready for discharge from the vessel and thus high residence time in the liquid state is avoided. The temperature of the heating element moreover is maintained close to the melting point of the solid being handled and decomposition of unstable compounds and burnout of the heating element when the supply of solids is exhausted are avoided.

Vessel 190 can include a heating jacket 204 about the lower portion thereof in order to prevent solidification of liquid in the lower portion of the vessel. Heating jacket 204 is preferably controlled by a thermocouple 206 immersed in the liquid at the bottom of vessel 190.

In FIG. 5 a system is shown whereby two liquids in two vessels 210 and 212 can be metered in constant ratio to each other using portions of two metering systems, each individually similar to that shown in FIG. 1. Those portions of FIG. 5 which appear also in FIG. 1 use the same reference numerals in both drawings, and a (') is used to distinguish structure associated with vessel 212 from identical structure associated with vessel 210, the reference numerals being otherwise identical.

Vessels 210 and 212 are similar to each other in all respects and include thermostatically controlled heating jackets 211, 211' and suitable connections 12, 12' whereby their interiors can be subjected to vacuum or inert atmosphere. Each vessel includes an operating cylinder 23, 23', a metering cylinder 13, 13', a piston rod 19, 19' and a metering piston 15, 15', all of which are similar in all respects to the corresponding portions of FIG. 1. Liquids discharged from vessels 210 and 212 are carried by discharge lines 214, 214' to a mixer 218, where they are mixed together and discharged for use through a check valve 220 and outlet 216. Check valves 29, 29' associated with metering cylinders 13, 13' and check valve 220 associated with mixer 218 are controlled by air under pressure from a common header 222 which is in turn controlled by a solenoid operated 3-way valve 224 which in its normal de-energized condition admits air to header 222 and is energized to vent header 222 to atmosphere.

Air is admitted to the lower portion of each operating cylinder 23, 23' by a common air conduit 226 to which air is admitted by a solenoid-operated 3-way valve 228 which in its normal de-energized condition admits air under pressure to conduit 226 and, when energized, vents conduit 226 to atmosphere. Oil is admitted to the top of each operating cylinder 23, 23' by an oil conduit 230, 230' which extends upwardly to an oil reservoir 232, 232' to which conduits 230, 230' are connected through bypass valves 234 and 234'. Bypass valves 234 and 234' are air operated and are connected by air conduits 236 and 236' to header 222 so that their operation is simultaneous with the operation of check valves 29, 29' and 220. When bypass valves 234 and 234' receive air under pressure from conduits 236 and 236' they are opened allowing full bypass and when header 222 is vented to atmosphere bypass valves 234 and 234' are closed.

Reservoir 232 includes an oil discharge conduit 238 which is connected to a constant delivery pump 240 from which oil is discharged into conduit 242 which is connected to oil conduit 230. When bypass valve 234 is open, oil discharged by pump 240 is returned to reservoir 232 through bypass valve 234. When bypass valve 234 is closed all oil discharged by pump 240 is forced into the top operating cylinder 23 through oil conduit 230. Reservoir 232' similarly is connected by oil discharge conduit 238' to a variable delivery pump 246 which discharges oil through conduit 242' connected to oil conduit 230'. When bypass valve 234' is open oil discharged by pump 246 is returned to reservoir 232' and when bypass valve 234' is closed oil discharged by pump 246 is forced through oil conduit 230' into the top of operating cylinder 23'.

Constant delivery pump 240 and variable delivery pump 246 are driven through a suitable gearbox 250 by a common motor 252 which is also connected to a revolution counter 254. Being thus connected to a common driver pumps 240 and 246 are operated simultaneously at identical speeds. By properly adjusting the single revolution capacity of variable delivery pump 246 relative to the single revolution capacity of pump 240, a desired ratio of oil introduced to the two operating cylinders 23 and 23' can be selected causing a corresponding constant ratio in movement of the two metering pistons 15 and 15' causing a consequent discharge of metered liquid through conduits 214 and 214' in constant ratio.

The tops of reservoirs 232 and 232' are connected through associated solenoid-operated 3-way valves 256 and 256' to a common air header 260. When valves 256 and 256' are in the normal de-energized condition, reservoirs 232 and 232' are vented to atmosphere; and when valves 256 and 256' are energized, air is admitted under pressure to the tops of reservoir 232 and 232'. Pressure actuated electric switches 262, 262' and 264, 264' are provided in each oil conduit 230 and 230'. Pressure switches 262 and 262' are connected also to the oil reservoirs 232 and 232' respectively by suitable air conduits 266, 266' and each operates to actuate associated electric contacts when the air pressure in the reservoir is equal to the oil pressure in the oil inlet lines. Pressure actuated electric switches 264 and 264' in each oil line act as a safety device, opening associated electric contacts when unusually high oil pressure occurs in the system because of a malfunction.

Figure 6:
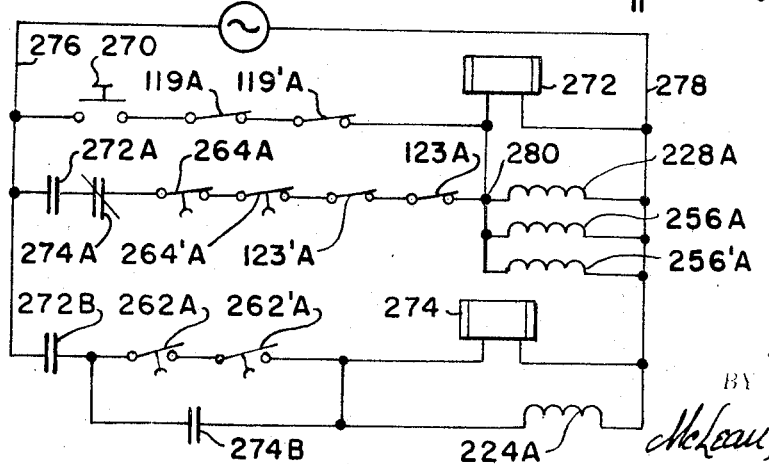
FIG. 6 is a schematic of an electrical control circuit for operating the system shown in FIG. 5.

The electrical control necessary to the operation of the dual metering system of FIG. 5 is shown in FIG. 6. A push button switch 270 is provided connected in series with the normally open pairs of contacts 119A and 119'A of the two upper limit switches 119 and 119', respectively, and a control relay coil 272 across power lines 276 and 278. Three solenoids 228A, 256A and 256'A are connected in parallel with relay coil 272, and a series circuit including a normally open pair of relay contacts 272A which close upon actuation of relay coil 272, a normally closed pair of relay contacts 274A, the normally closed pairs of contacts 123A and 123'A of the two lower limit switches 123 and 123', and the two normally closed pairs of contacts 264A and 264'A associated with safety pressure switches 264 and 264' are connected between power line 276 and common junction 280 between relay coil 272 and solenoids 228A, 256A and 256'A in parallel with switch 270 and contact pairs 119A and 119'A.

Once relay coil 272 is activated by closure of switch 270, it is maintained in that condition by the closing of normally open contact pair 272A until that holding circuit is broken by the opening of normally closed contact pair 274A or any one of contact pairs 264A, 264'A, 123A or 123'A. Another circuit connected across power lines 276 and 278 includes a normally open pair of contacts 272B, which close upon actuation of relay 272, two normally open pairs of contacts 262A and 262'A associated with pressure switches 262 and 262' and a counter relay coil 274. A solenoid 224A is connected in parallel with counter relay coil 274 and is energized simultaneously therewith, and a normally opened pair of counter relay contacts 274B which close upon activation of counter relay coil 274 is connected in parallel with pressure switches 262 and 262'. Motor 252 is controlled by a separate starter (not shown) and is kept running at constant speed while the metering system is in use.

Operation of the dual metering system of FIGS. 5 and 6 is as follows. Operation begins with motor 252 running and the electrical control in the normal, de-energized condition in which condition solenoids 228A, 256A, 256'A and 224A are de-energized so that check valves 29, 29' and 220 which they respectively control are closed. Vessels 210 and 212 contain liquids which are to be mixed in a definite ratio as they are dispersed in metered quantities, and to this end the capacity of pump 246 relative to pump 240 is adjusted to provide such ratio. Bypass valves 234 and 234' are open, and air under pressure is admitted to the bottoms of operating cylinders 23 and 23' forcing piston rods 19 and 19' upwardly until they reach their extreme, upward positions at which metering pistons 15 and 15' are completely withdrawn from metering cylinders 13 and 13' allowing liquids from vessels 210 and 212 to enter them. The tops of reservoirs 232 and 232' are vented to atmosphere. When piston rods 19 and 19' reach their extreme, upward positions, upper limit switches 119 and 119' are actuated to close contact pairs 119A and 119'A, the position in which they are shown in FIG. 6.

When both contact pairs 119A and 119'A have closed, a discharge cycle is begun by the closing of push button 270 which energizes relay coil 272 closing relay contacts 272A thereby retaining relay coil 272 energized even though push button 270 returns to its open position upon its release and even though piston rods 19 and 19' move downwardly opening upper limit switch contact pins 119A and 119'A. This holding circuit remains closed until either a safety pressure switch contact pair 264A or 264'A, a lower limit switch contact pair 123A or 123'A or normally closed contact pair 274A is opened. Closure of push button switch 270 and contacts 272A also energizes solenoids 228A, 256A and 256'A causing the venting of the lower portions of operating cylinders 23 and 23' through conduit 226 and 3-way valve 228 and the admission of air under pressure to the tops of reservoirs 232 and 232' through header 260 and 3-way valves 256 and 256'.

When air under pressure is admitted to the tops of reservoirs 232 and 232', the oil pressure in each of oil lines 230 and 230' increases causing oil to flow into the tops of operating cylinders 23 and 23' thereby forcing piston rods 19 and 19' downwardly. This causes metering pistons 15 and 15' to enter metering cylinder 13 and 13' until pistons 15 and 15' stall taking the cushion out of the liquids trapped in cylinders 13 and 13', until the pressure exerted upwardly against metering pistons 15 and 15' by the liquid entrapped in metering cylinders 13 and 13' is equal to the downward force exerted on metering pistons 15 and 15' by the oil in operating cylinders 23 and 23'. As this occurs in each cylinder 23, 23', downward movement of pistons 15 and 15' stops, i.e., they stall, and the oil pressures in oil conduits 230 and 230' reach equilibrium states at which such pressures are equal to the air pressures in the tops of reservoirs 232 and 232' causing actuation of pressure switches 262 and 262' with consequent closing of contact pairs 262A and 262'A. When both contact pair 262A and 262'A have closed, i.e., metering pistons 15 and 15' have both stalled, since contact pair 272B was closed upon actuation of relay coil 272, counter relay coil 274 is actuated and solenoid 224A is also actuated. When solenoid 224A is energized header 222 is vented to atmosphere which opens check valves 29, 29' and 220 and closes bypass valves 234 and 234'. All oil discharged thereafter from constant delivery pump 240 and variable delivery pump 246 is forced through oil conduits 230 and 230' into the top of operating cylinders 23 and 23' causing further downward movement of piston rods 19 and 19' at relative rates of movement according to the relative capacities at which pumps 240 and 246 are operating. The downward movement of piston rods 19 and 19' causes movement also of metering pistons 15 and 15' and discharge of fluids from metering cylinders 13 also in relative ratios to each other corresponding to the capacities at which pumps 240 and 246 are operating. The activation of counter relay coil 274 simultaneously with the energizing of solenoid 224A causes all revolutions of motor 252 after that time to be recorded. The recorded number of revolutions of motor 252 is a measure of the oil introduced to the tops of cylinders 23 and 23' after the opening of check valves 29 and 29' and therefore provides a direct measure of liquid discharged through conduits 214 and 214' into mixer 218. Since normally open pair of contacts 274B closed upon actuation of coil 274, the opening of contact pairs 262A and 262'A upon the oil pressure change resulting from closure of bypass valves 234 and 234' does not release actuation of coil 274.

The downward movement of piston 15 and 15' continues until the happening of one of three events; the opening of either of the lower limit switch contact pairs 123A or 123'A, the opening of either of the safety switch contact pairs 264A or 264'A, or the opening of normally closed counter relay contact pair 274A, any of which events de-energizes relay coil 272 releasing relay contacts 272A and 272B thereby de-energizing the entire system. Normally closed counter relay contacts 274A are not opened simultaneously with the actuation of counter relay coil 274 but are connected to it through a preset count responsive circuit so that contacts 274A are only opened in the event that counter 254 reaches a predetermined count representing the liquid discharge which is desired.

Upon the de-energizing of the control circuit shown in FIG. 6 air is admitted to operating cylinders 23 and 23' through air conduit 26 forcing operating pistons 113 and 113' upward until the extreme position of each is reached thereby closing upper limit switches 119 and 119', and air is also admitted to check valves 29, 29' and 220 closing them and to bypass valves 234 and 234' opening them. When upper limit switches 119 and 119' are closed, the entire system is ready to start a new cycle which will begin immediately if push button 270 is depressed.

My invention as described above will solve a wide variety of material handling problems. It will be noted that the only moving contact between parts of the metering system which occurs in contact with the liquid being handled is between metering piston 15 and piston seal 65. Since the latter is made of a resilient material, such as polytetrafluoroethylene or urethane rubber, it is possible to handle highly abrasive liquids without serious damage to the equipment.

Figure 7:
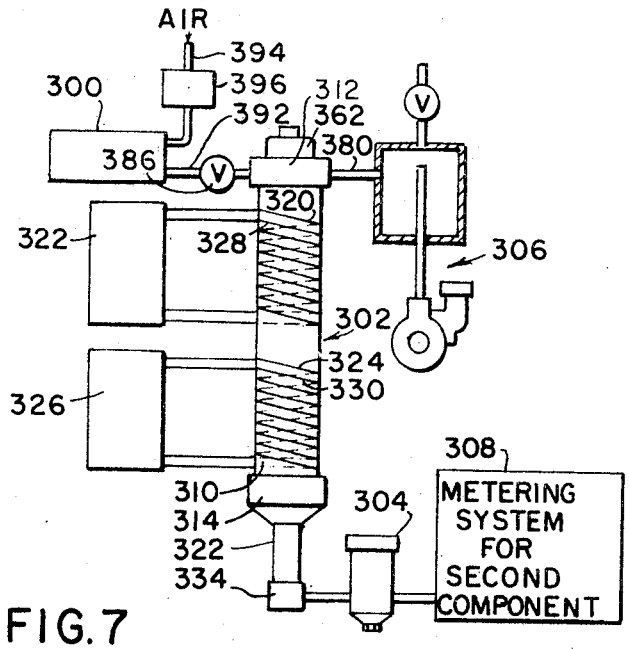
FIG. 7 is a somewhat schematic elevation shown partly in section of the meter shown in FIG. 1, in combination with a liquid degassing and heating device, which is connected to withdraw material from a storage vessel and deliver in precisely metered quantities at a desired set temperature to a mixing device in which the material is mixed with other materials similarly delivered simultaneously to the mixing device and from which such materials are discharged for use.

Referring to FIG. 7, there is shown a system similar in general organization to that of FIG. 6 for metering and charging exact proportions of two reactive components to a mixer which is equipped to discharge the mixed components. In the system of FIG. 7 many of the control details of FIG. 5 have been omitted as have the details of the metering system for one of the components. In FIG. 7 the metering system for the one component shown is especially adapted to metering a liquid component which is to be heated to lower its viscosity and to be degassed prior to metering and then delivery to the mixer. The metering system for the other component delivered to the mixer can be the same or any other desired system, dependent on the nature of the component to be metered and desirably is controlled to operate in a manner similar to illustrated component metering system by some mechanism, such as that described with reference to FIG. 6.

In FIG. 7 the reference numeral 300 designates a reservoir for a liquid component to be heated, degassed and metered; for example, reservoir 300 can be the drum in which the component is shipped. The reference numeral 302 designates a vertical column which serves as a vessel for carrying out heating, degassing and metering, while the reference numeral 304 designates a mixer similar to mixer 218 described in FIG. 5. The system further includes evacuating apparatus 306 and the second metering system 308 which is shown only diagrammatically.

Figure 10:
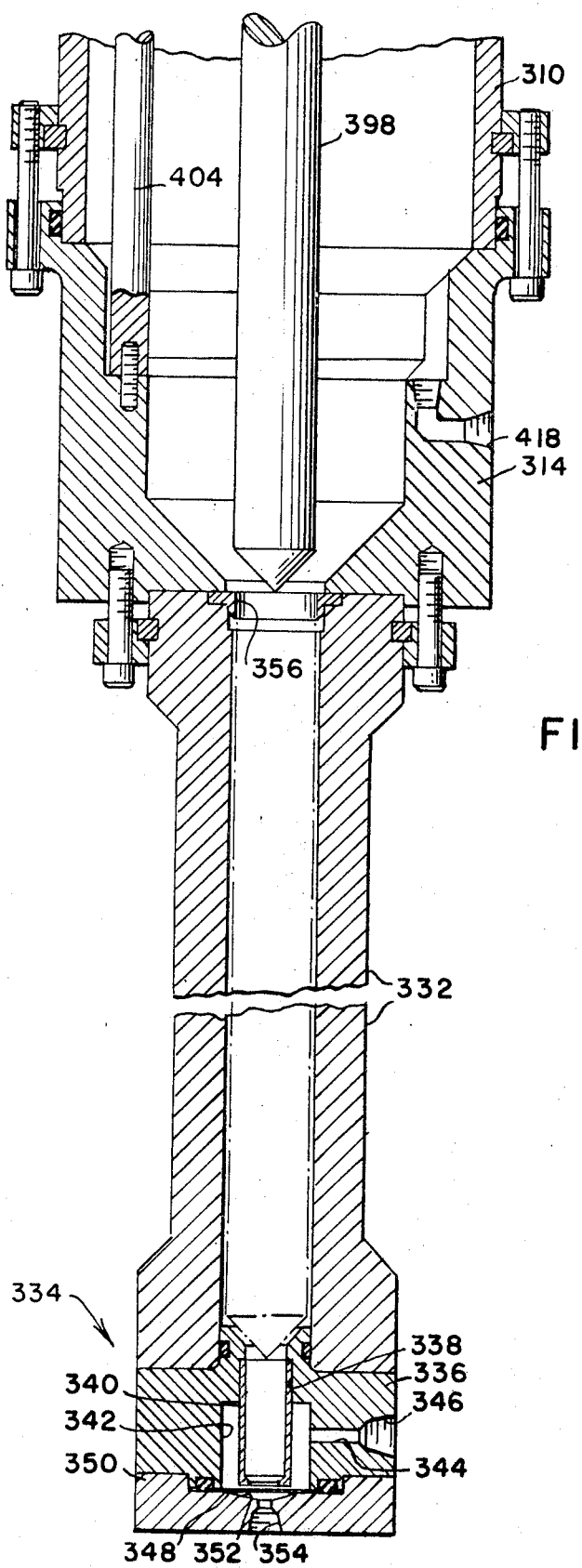
FIG. 10 is an enlarged fragmentary vertical section of the lower portion of the device shown in FIGS. 7, 8 and 9.

Tower 302, which forms the heart of the system shown in FIG. 7 is more fully described with reference to FIGS. 8, 9 and 10. Basically, tower 302 includes an elongated, vertical, stainless steel cylinder 310, which is closed by a cap 312 secured to its upper end and by a cap 314 secured to its lower end. Intermediate its ends, the exterior of cylinder 310 is provided with a pair of parallel equally spaced low-pitched helical grooves 316 and 318. An insulated electrical resistance heater 320, which is of a cross-section sized substantially to fill groove 316, is positioned in groove 316, and hence helically distributed about cylinder 310, along the upper half of cylinder 310. At its ends heating element 320 is electrically connected to a control system diagrammatically indicated as box 322. A second electrical resistance heating element 324 is similarly positioned in groove 316 substantially throughout the lower half of cylinder 310, such that it is disposed helically about such lower half. Element 324 is similarly connected at its ends to a control system designated by box 326. An insulated electrical resistance wire 328, typically nickel wire, which forms a temperature sensing element, is similarly disposed in groove 318 in the upper half of cylinder 310, such that it lies between the turns of heating element 320. Similarly element 328 is connected at its ends to control system 322. An insulated electrical resistance wire 330, which forms a temperature sensing element, is disposed in groove 318 throughout the lower half of cylinder 310. Element 330 is connected at its ends to control system 326.

Each of control systems 322 and 326 is conventional and includes a device for measuring the resistance of elements 328 and 330, respectively, and a relay system for connecting the associated heating elements 320 and 324, respectively, to a source of electrical power whenever the resistance of the associated sensing elements 328 and 330, respectively, falls below a selectable minimum resistance and for disconnecting the associated heating elements 320 and 324, respectively, when the resistance of the associated elements 328 and 330, respectively, exceeds a preselected maximum resistance. Substantially, the entire length of cylinder 310, except for short lengths at its ends, is encased in a thick layer 332 of thermal insulation overlying grooves 316 and 318 and elements 320, 324, 328 and 330.

Cap 314 is interiorly shaped to form a conical collecting vessel in the lower end of cylinder 310, which is centrally apertured at its lower, apex end. Beneath cap 314 there is attached to cap 314 a depending metering cylinder 332 which is essentially identical with metering cylinder 13 except for its transverse dimensions. Thus the lower end of cylinder 332 is closed by a check valve 334 which includes a block 336 having a central vertical passage 338 in its top. A tube 340 depending from the upper end of passage 338 in which tube 340 is affixed registers with the upper end of passage 338 which is enlarged in the lower end of block 336 to form an annular discharge passage 342 which surrounds the lower end of tube 340 and communicates with a horizontal liquid discharge conduit 344 through a port 346 in the side of block 336. A diaphragm 348 extends across the bottom of block 336 closely adjacent the lower end of tube 340 and is held in place by an air cap 350 affixed to block 336 in peripheral sealing relationship between block 336 and cap 350. Diaphragm 348 is made of a high temperature resistant, impervious, resilient material, such polytetrafluoroethylene and tetrafluoroethylene-hexafluoropropylene copolymer, and fabrics impregnated with such materials. Air cap 350 is relieved in its face adjacent diaphragm 348 to form a shallow, conical recess 352, which extends below diaphragm 348 and has a slightly greater base diameter than annular discharge passage 342 with which it is aligned. A central passage 354 in cap 350 communicates with the space in cap 350 between recess 352 and diaphragm 348 to permit connection with an air supply for the purpose of admitting air to such space under sufficient pressure to force diaphragm 348 against the lower edge of tube 340 and to thus prevent the discharge of fluid from metering cylinder 332.

An annular piston seal 356 of a suitable resilient material, such as polytetrafluoroethylene or urethane rubber is held in place heated in the upper end of cylinder 332.

The interior of cylinder 310 includes a rotary splasher 360 (see FIG. 8), a metering piston 398 (see FIG. 10) and an operating cylinder 400 (see FIG. 9), all coaxially positioned in reference to the axis of cylinder 310.

Splasher 360 is mounted to upper end cap 312 and includes an air motor drive 362 mounted centrally on top of cap 312 having a depending rotatable drive shaft 364 extending axially through cap 312 with suitable bearings and seals. Interiorly of cylinder 310 and at its upper end splasher 360 further includes a horizontal baffle plate 366, which is a circular plate mounted on shaft 364 immediately beneath the underside of cap 312. A shaft extension 368 is connected at its upper end to the lower end of shaft 364 and has affixed to its lower end a splasher plate 370 above which and to which an annular guide 372 is affixed.

The underside of cap 312 is provided with annular recess 374 which is completely covered by baffle plate 366, there being a small clearance between the underside of cap 312 and baffle plate 366. A passage 376 in cap 312 communicates recess 374 with a port 378 in the side of cap 312, which as is shown in FIG. 7 is connected to a conduit 380 leading to evacuation apparatus 306. A second passage 382 is located in cap 312 for introducing lubricant to the seals in cap 312 about shaft 364.

Also at the upper end of cylinder 310 (see FIG. 8) there is provided a feed inlet generally designated by the reference numeral 384 which includes an air operated valve 386 functionally and structurally similar to check valve 334, with the exception that fluid flow is in the reverse direction through valve 386. Valve 386 thus includes a port 388 for connection to an air control line and an inlet port 390 which, as is shown in FIG. 7 is connected through a line 392 to tank 300 for direct feeding of liquid reactant stored in tank 300 when valve 386 is open. Suitably an air line is also connected to the upper portion of tank 300, as indicated by conduit 394, through a suitable desiccant containing vessel 396 in order to apply pressure to the contents of tank 300, such that they will be forced through line 392 to inlet 384 under the control of valve 386.

The discharge side of inlet 384 leading from valve 386 is a small tube 392 which enters cylinder 310 along a radial line and at its tip is directed downwardly onto splasher plate 370 within annular guide 372. Annular guide 372, as can be seen in FIG. 8, includes a flat annular ring having a depending peripheral flange 394, which at its outer lower rim defines a circular slit 396 with the upper surface of splasher 370. Thus, as motor 362 rotates splasher 360 when valve 386 is open to allow liquid feed to enter through tube 392 such liquid feed is deposited on splasher plate 370 and is centrifugally thrown generally uniformly onto the interior wall of cylinder 310 down which the liquid falls by gravity as a thin film.

Metering piston 398 (see FIGS. 9 and 10) is coaxially positioned in the lower end of cylinder 310 to cooperate with metering cylinder 332 in the same manner as piston 15 cooperates with metering cylinder 27 as described with reference to FIGS. 1 and 2. Operating cylinder 400 is interiorly mounted within cylinder 310 (see FIG. 9) and generally functions to operate piston 398 the same as operating cylinder 23 functions to operate piston 15 in the arrangement shown in FIGS. 1 and 2, with the notable exception that certain changes in construction are required to operate cylinder 400 within cylinder 310.

Thus cylinder 400 is positioned vertically and coaxially within cylinder 310 mounted at its lower end on a pedestal 402 which is in turn mounted on the upper ends of three support rods 404, the lower ends of which are secured (see FIG. 10) in cap 314. Cylinder 400 is closed at its upper end by a cap 406, while pedestal 402 is designed to close the lower end of cylinder 400. A piston 408 is mounted in cylinder 400 for a vertical reciprocation in sliding, sealing contact with the inner walls of cylinder 400 and carries a depending piston rod 410 which slidably extends in sealing contact through support 402 and is affixed below support 402 to the upper end of piston 398. A bellows seal 412 is provided between the upper end of piston 398 and the underside of support 402 to assure the prevention of contamination of the interior of cylinder 310 by hydraulic and pneumatic fluids used to operate piston 408.

Cap 406 is suitably provided with a port 414 for connection to a hydraulic fluid control system, such as that shown in FIG. 1 for pressuring the upper side of piston 113 in that figure, and 408 in the present instance, while support 402 is similarly provided with a port 416 for similar connection to an air, piston return system. Typically suitable conduits connecting ports 414 and 416 are brought through cylinder 310 to distinct ones of a number of ports 418 located peripherally about cap 314, enough such ports 418 being provided to permit insertion of liquid level controls, thermocouples and such other devices as may desirably be located in the interior of column 310.

In utilizing the overall system shown in FIG. 7 metering system 308 is selected on the basis of the material which is to be mixed in mixer 304 with that passing through column 302. System 308 can be connected to evacuation system 306 if desired to provide degassing functions. The operation of valve 386 to provide fresh feed liquid to column 302 is controlled by the liquid level in the lower portion of cap 314, as for example, is described with reference to liquid level control 198 in the apparatus shown in FIG. 4, except that in the present case liquid level is controlled not by the application of heat to a solid but by the opening or closing of a valve.

Controllers 322 and 326 are set such that heating element 328 is energized to hold the average temperature in the upper portion of column 310 at the temperature at which the liquid component being heated, degassed and metered is to be utilized, and controller 326 is similarly arranged to control the average temperature of the lower portion of column 310. Thus, as valve 386 is opened by a fall in the liquid level below a preselected level in cap 314, fresh feed material is directed onto splasher 370 and slung as a thin uniform sheet against and about the inner wall of cylinder 310 down which the liquid material flows as a thin uniform film. Normally, the feed material is at a temperature lower than the average temperature of the upper portion of column 310, causing the resistance of sensing element 328 to decrease, whereupon controller 322 energizes heater 320, tending to bring the average temperature of the upper portion of column 310 back to the set point. Since, however, the cooling of column 310 where initially struck by the cold feed inlet has reduced the temperature of that portion of the column and since heater 320 has a uniform heat input along the length of column 310 about which it is wound, the temperature of the upper portion of the column below that at which the feed enters is raised above the average temperature of the upper portion of the column. Assuming the conditions of the heat transfer along the upper length of the column are uniform, as the cold feed descends along the column, by the time it reaches the end of the upper portion of the column about which heater 320 is positioned, it should reach the average temperature of the upper portion of the column. As the liquid film descends into the lower portion of the column controller 326 causes the same conditions to occur, thus providing extremely sensitive control of the material falling through the column.

The application of vacuum to the column provides efficient degassing of the falling thin film of liquid. Baffle plate 366 serves to prevent any droplets which may be formed during degassing from splashing against vacuum inlet recess 374 and passage 376 in order to maintain proper vacuum condition. Thus the resulting liquid reservoir in cap 314 and cylinder 332 is thoroughly degassed and at the proper temperature for use. Additional heating devices can be employed about cap 314 and cylinder 332 in order to hold the liquid at such desired temperature.

As illustrative of the effectiveness of the heating and degassing operation, in a six inch inside diameter column of forty-two inch length having a heating arrangement such as that associated with controller 322, at a feed flow rate of three pounds per minute utilizing 828 resin (16,000 centipoise bisphenol base) any desired temperature within the stable range of the base can be achieved plus or minus one-half of a degree F., while the hold-up flowing through the column is only 180 gms. The significance of this when employing materials with heat histories is obvious.

Typical uses for the particular systems shown in the drawings include degasification and heating of liquids having heat histories in the vessel of FIGS. 7–10 for use in injection molding operations. The vessel of FIG. 4 is useful for continuously providing a small liquid amount of compounds which are unstable in the liquid phase such as phthalic anhydride. The dual metering system of FIG. 5 is especially suited for mixing compounds in constant ratio to each other just prior to their incorporation into a solidified product. The combination of an epoxy resin with a hardening agent as the penultimate step of an encapsulation process provides a good example of such a use. It should be understood that while plain vessels 210 and 212 are shown in FIG. 5, other types of vessels such as those shown in FIGS. 4 and 7 can be substituted for them.

While the meter of the present invention can be used under any conditions of pressure it will be especially helpful in the metering of liquids from vacuum vessels which is particularly a difficult materials handling problem. The occurrence of voids within liquid bodies is most frequent under conditions of vacuum and the substantial elimination of voids in liquids discharged from the meter of the present invention allows realization of higher accuracy in metering these liquids than has heretofore been possible. clean, simple and straightforward solution to materials handling particularly for toxic materials, materials having a heat history and abrasive materials. Not only are problems of gassing during metering avoided but the requirements for heated lines are obviated; there is less need for controls; and residence times at high temperature are minimized as warm-up time is short and accumulation of heated liquid need not be large.

I claim:

1. An apparatus suitable for effecting withdrawal of a liquid from a vessel which includes means defining a chamber attached to said vessel and communicating therewith; liquid discharge means communicating with the interior of said chamber, discharge control means operative to prevent or permit the flow of liquid through said liquid discharge means, a piston movable between a position withdrawn from said chamber in said vessel and a position with an end of said piston in said chamber, sealing means in said chamber for closing communication between said vessel and chamber when said end of said piston is in said chamber, means for advancing said piston from said vessel into said chamber, and means operating said discharge control means to prevent flow of liquid through said discharge means while said piston advances into said chamber up to a point of predetermined resistance to said movement of said piston at which said piston stalls, said means for operating said discharge control means being responsive to said stalling condition of said piston to operate said discharge control means to permit flow of liquid through said passage upon further advance of said piston into said chamber.

2. The apparatus of claim 1 wherein said vessel is a liquid degasification vessel having vertical interior walls and said chamber is attached to said vessel at the bottom thereof.

3. Apparatus according to claim 2 wherein said liquid degasification vessel includes means for introducing liquid near the top of said vessel, means for causing said liquid to flow down the interior walls of said vessel in a film, means for subjecting the interior of said vessel to vacuum, and means for controlling the accumulation of liquid in the bottom of said vessel.

4. Apparatus according to 3 in which the walls of said vessel have means distributed along a vertical length thereof responsive to the average temperature of said length of said walls, heating means distributed along said vertical length of said walls, and control means responsive to said average temperature responsive means to control said heating means whereby said vertical length of said walls is maintained at a preselected average temperature.

5. Apparatus according to claim 4 in which said vessel is a column having a pair of parallel helical grooves formed in the exterior surface thereof along said vertical length thereof in which said average temperature responsive means includes a length of electrical resistance wire distributed helically in one said groove in which said heating means includes an elongated electrical heating element distributed helically in the second of said grooves.

6. An apparatus according to claim 1 wherein said vessel is a solids melting vessel.

7. An apparatus according to claim 6 wherein said solids melting vessel includes a heater positioned in said vessel above its bottom which heater is impervious to solids and pervious to liquids, means defining a subchamber extending upward from said heater for the storage of solids to be melted thereby, and means for controlling the operation of said heater responsive to the accumulation of liquid in the bottom of said vessel.

8. A thin film heating column including means to distribute a thin film of liquid about the upper end of the inner walls of the column, means distributed along a vertical length of the walls of said column responsive to the average temperature of said length of said walls, heating means distributed along said vertical length of said walls, and control means responsive to said average temperature responsive means to control said heating means whereby said vertical length of said walls is maintained at a preselected average temperature.

9. Apparatus according to claim 8 in which said column includes a pair of parallel helical grooves formed in the exterior surface thereof along said vertical length thereof in which said average temperature responsive means includes a length of electrical resistance wire distributed helically in one said groove and in which said heating means includes an elongated electrical heating element distributed helically in the second of said grooves.

10. A method for effecting withdrawal of a liquid from a vessel having a chamber attached to said vessel communicating therewith into which liquid can flow from said vessel, which includes advancing a piston into said chamber in sealing relation with the opening of said chamber into said vessel while preventing flow of liquid into said chamber, said piston being so advanced up to a point of predetermined resistance to the movement of said piston at which said piston stalls, and thereafter, in response to said stalling condition of said piston, permitting flow of liquid out of said chmaber upon further advance of said piston into said chamber thereby to dispense liquid from said chamber.

References Cited

UNITED STATES PATENTS

| 1,723,733 | 8/1929 | Hyde et al. | 219—311 X |
| 1,757,236 | 5/1930 | Davis | 222—383 X |
| 3,032,635 | 5/1962 | Kraft | 222—146 X |
| 3,178,067 | 2/1965 | Bell et al. | 222—146 |
| 3,229,445 | 1/1966 | Kraft | 222—146 X |
| 3,323,510 | 6/1967 | McIntyre | 222—54 X |
| 2,709,538 | 5/1955 | Harrington | 222—383 X |

ROBERT B. REEVES, Primary Examiner

H. S. LANE, Assistant Examiner

U.S. Cl. X.R.

219—311; 222—52, 134, 146, 334